United States Patent
Kim et al.

(10) Patent No.: US 8,440,760 B2
(45) Date of Patent: May 14, 2013

(54) METHACRYLIC COPOLYMER, METHOD FOR PREPARING THE SAME, AND METHACRYLIC RESIN COMPOSITION INCLUDING THE SAME

(75) Inventors: Il Jin Kim, Uiwang-si (KR); Kee Hae Kwon, Uiwang-si (KR); Hyung Rang Moon, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 246 days.

(21) Appl. No.: 12/758,073

(22) Filed: Apr. 12, 2010

(65) Prior Publication Data

US 2010/0197850 A1  Aug. 5, 2010

Related U.S. Application Data

(63) Continuation-in-part of application No. PCT/KR2008/005981, filed on Oct. 10, 2008.

(30) Foreign Application Priority Data

Oct. 18, 2007  (KR) .................. 10-2007-0104929
Oct. 7, 2008  (KR) .................. 10-2008-0098295

(51) Int. Cl.
*C08L 33/06* (2006.01)
*C08F 220/26* (2006.01)

(52) U.S. Cl.
USPC ........ 524/502; 524/853; 526/328.5; 526/326; 526/318.4; 526/320; 526/307.7; 525/55; 525/227

(58) Field of Classification Search .................. 524/502, 524/853; 526/328.5, 326, 318.4, 320, 307.7; 525/55, 525/227
See application file for complete search history.

(56) References Cited

U.S. PATENT DOCUMENTS

| 4,027,073 A | 5/1977 | Clark |
| 6,107,364 A | 8/2000 | Fong et al. |
| 6,355,754 B1 | 3/2002 | Olson et al. |

FOREIGN PATENT DOCUMENTS

| EP | 0 090 558 A1 * | 10/1983 |
| EP | 0090558 A1 | 10/1983 |
| KR | 2004-79118 A | 9/2004 |

OTHER PUBLICATIONS

Extended European Search Report in counterpart European Application No. 08840352 dated Feb. 25, 2011, pp. 1-5.
Min, K.E. et al., "Miscibility of polycarbonate with poly(methyl mehtacrylate-co-cyclohexyl methacrylate)", Polymer Bulletin, 24(2), pp. 221-226, (1990).
Nishimoto, M. et al., "Misibility of polycarbonate with methyl methacrylate-based copolymers", Polymer, 32(7), pp. 1274-1283, (1991).
International Search Report in counterpart International Application No. PCT/KR2008/005981, dated Apr. 30, 2009.

* cited by examiner

*Primary Examiner* — Robert D. Harlan
(74) *Attorney, Agent, or Firm* — Summa, Additon & Ashe, P.A.

(57) ABSTRACT

Disclosed herein is a methacrylic copolymer which is a polymer of a monomer mixture comprising about 20 to about 99.9% by weight of a $C_{6\text{-}20}$ aromatic methacrylate, an aliphatic methacrylate, or a combination thereof, and about 0.1 to about 80% by weight of a mono-functional unsaturated monomer. The methacrylic copolymer can have a high refractive index of about 1.495 to about 1.59, and thus when it is blended with polycarbonate resin, it is possible to obtain a methacrylic resin composition having improved compatibility without any other compatibilizer.

18 Claims, No Drawings

US 8,440,760 B2

METHACRYLIC COPOLYMER, METHOD FOR PREPARING THE SAME, AND METHACRYLIC RESIN COMPOSITION INCLUDING THE SAME

CROSS-REFERENCE TO RELATED APPLICATIONS

This application is a continuation-in-part of International Application No. PCT/KR2008/005981, filed Oct. 10, 2008, pending, which designates the U.S., published as WO 2009/051373, and is incorporated herein by reference in its entirety, and claims priority therefrom under 35 USC Section 120. This application also claims priority under 35 USC Section 119 from Korean Patent Application No. 10-2007-0104929, filed Oct. 18, 2007, in the Korean Intellectual Property Office, and from Korean Patent Application No. 10-2008-0098295, filed Oct. 7, 2008, in the Korean Intellectual Property Office, the entire disclosure of each of which is also incorporated herein by reference.

FIELD OF THE INVENTION

The present invention relates to a methacrylic copolymer that can have improved refractive index, a method for preparing the same, and a methacrylic resin composition including the same.

BACKGROUND OF THE INVENTION

Recently, demand has increased for housing materials with high technology and multifunctional properties as large and light-weight products are becoming more widespread. In particular, as the appearance of molded products has become important, there is a need for a high glossy material which can provide both scratch resistance and high grade texture, in addition to a flame retardant material having stability against fire.

One method for obtaining both scratch resistance and flame retardancy is to alloy polycarbonate (PC) resin and methacrylate resin, such as polymethylmethacrylate (PMMA). The polycarbonate resin has good mechanical strength, transparency, thermal stability, self-extinguishing property, and dimensional stability so that it has been widely used in electrical and electronic products and parts of automobiles. Further, the polycarbonate resin can obtain flame retardancy even with a small amount of flame retardant, compared to a conventional polymer, since its chemical structure allows good flame retardancy. However, polycarbonate resin does not by itself exhibit good scratch resistance because the polycarbonate resin has a low pencil hardness of B or so. On the other hand, although PMMA has a high pencil hardness of 3H~4H, and thus can exhibit good scratch resistance, it can be difficult to impart flame retardancy to the PMMA resin with a conventional flame retardant. Accordingly, blending a PC resin and a PMMA resin has been suggested to improve both scratch resistance and flame retardancy.

However, even when the PC resin and the PMMA resin are melt-blended at a high temperature, they may divide into separate phases due to their lack of compatibility. It can also be very difficult to use an alloy of PC and PMMA in housings of electrical and electronic products. Due to the different refractive indices of the PC resin and the PMMA resin (1.59 and 1.49, respectively), the alloy of PC resin and PMMA resin may scatter light. This makes it difficult to provide color with high chroma, and a melt joining line is clearly shown during extrusion.

Korean Patent Publication Laid-open No. 2004-79118 discloses a method of lowering the molecular weight of polycarbonate during a melt blending process using metal stearic acid ester in order to improve the compatibility between a polycarbonate resin and a methacrylate resin. However, the method has a disadvantage in that a blend of the polycarbonate and the methacrylate resin has limited transparency and significantly low mechanical properties.

U.S. Pat. No. 4,027,073 discloses a method of coating the surface of a resin to improve scratch resistance. The method, however, requires an additional process step.

SUMMARY OF THE INVENTION

The present inventors have developed a methacrylic copolymer that can have a high refractive index, for example about 1.495 to about 1.59, and good compatibility with polycarbonate. The present inventors Wave also developed a method for preparing the methacrylic copolymer of the invention and a methacrylic resin composition including the same. The methacrylic copolymer can substitute for a PMMA resin in a conventional PC-PMMA alloy. When the methacrylic copolymer of the invention is blended with a polycarbonate resin, the blend can have a total light transmittance of 10%, and a haze of 98% or less measured by a Haze meter.

The present invention further provides a compatibilizer using the methacrylic copolymer with a high refractive index and a method of using the compatibilizer.

The present invention further provides a methacrylic resin composition having good scratch resistance by using the methacrylic copolymer with a high refractive index, while minimizing the deterioration of transparency and colorability due to the difference between the refractive index of the methacrylic resin and the polycarbonate.

The present invention further provides a novel method for preparing a methacrylic copolymer which can have a high refractive index.

One aspect of the invention provides a methacrylic copolymer. The methacrylic copolymer may be prepared by polymerizing a monomer mixture comprising (a) about 20 to about 99.9% by weight of an aromatic methacrylate having specific structure, an aliphatic methacrylate having a specific structure, or a combination thereof; and (b) about 0.1 to about 80% by weight of a mono-functional unsaturated monomer. A sample with a thickness of about 2.5 mm prepared by extruding a blend comprising the methacrylic copolymer and a bisphenol-A linear polycarbonate resin having a weight average molecular weight of about 25,000 g/mol at a ratio of 2:8 can have a total light transmittance of about 10% or more and a haze of about 98% or less measured by a Haze meter. In an exemplary embodiment, the total light transmittance may be about 30% or more.

The mono-functional unsaturated monomer may be selected from the group consisting of (meth)acrylic acid esters, acrylic acid esters, unsaturated carboxylic acids, acid anhydrides, hydroxyl group containing esters, (meth)acrylamides, unsaturated nitriles, allyl glycidyl ethers, glycidyl methacrylates, and styrenic monomers.

In another exemplary embodiment, the methacrylic copolymer may comprise (a) about 50 to about 90% by weight of an aromatic methacrylate having a specific structure, an aliphatic methacrylate having a specific structure, or a combination thereof; and (b) about 10 to about 50% by weight of a mono-functional unsaturated monomer.

In another exemplary embodiment, the methacrylic copolymer of the present invention may have a weight average molecular weight of about 3,000 to about 300,000 g/mol, and a refractive index of about 1.495 to about 1.59.

Another aspect of the present invention relates to a compatibilizer comprising a methacrylic copolymer. The methacrylic copolymer may comprise (a) an aromatic methacrylate unit, an aliphatic methacrylate unit, or a combination thereof; and (b') a mono-functional unsaturated monomer unit selected from a $C_{1-6}$ alkyl(meth)acrylate or styrene. The methacrylic copolymer compatibilizer and may have a weight molecular average weight of about 3,000 to about 300,000 g/mol and a refractive index of about 1.495 to about 1.59.

In an exemplary embodiment, the copolymer may comprise (a) about 55 to about 90% by weight of the aromatic methacrylate unit, aliphatic methacrylate unit, or a combination thereof; and (b') about 10 to 45% by weight of the mono-functional unsaturated monomer unit. In another exemplary embodiment, the copolymer may further comprise an additional mono-functional unsaturated monomer unit selected from the group consisting of unsaturated carboxylic acids, acid anhydrides, hydroxyl group containing esters, (meth)acrylamides, unsaturated nitriles, allyl glycidyl ethers, and glycidyl methacrylates.

The compatibilizer comprises the foregoing methacrylic copolymer can be characterized in that a blend of the foregoing methacrylic copolymer and a bisphenol-A linear polycarbonate resin having a weight average molecular weight of about 25,000 g/mol at a ratio of 2:8 may have a total light transmittance of about 10% or more and a haze of about 98% or less measured by a Haze meter. In an exemplary embodiment, the total light transmittance may be about 30% or more.

According to another aspect of the present invention, there is provided a methacrylic resin composition including the methacrylic copolymer of the invention. The methacrylic resin composition may comprise about 1 to about 99 parts by weight of the methacrylic copolymer; and about 1 to about 99 parts by weight of a polycarbonate resin. The resin composition may further comprise additives.

In exemplary embodiments, the resin composition may have a total light transmittance of about 10% or more and a haze of about 98% or less measured by a Haze meter. In exemplary embodiments, the total light transmittance may be about 30% or more.

According to another aspect of the present invention, there is provided a method of using the compatibilizer of the invention as a compatibilizer in an alloy of a polycarbonate resin and a (meth)acrylate resin. In exemplary embodiments of the method, the compatibilizer may be used in an amount that ranges from about 10 to about 40 parts by weight, per 100 parts by weight of an alloy of a polycarbonate resin and a (meth)acrylate resin.

According to another aspect of the present invention, there is provided a method for preparing a methacrylic copolymer. The method comprises suspension polymerizing a monomer mixture comprising (a) an aromatic methacrylate, an aliphatic methacrylate, or a combination thereof; and (b) a mono-functional unsaturated monomer in the presence of a polymerization initiator and a chain-transfer agent. In exemplary embodiments, the method may further comprise adding additives to the monomer mixture before the suspension polymerization. In other exemplary embodiments, the method may further comprise adding additives to the suspension polymerized methacrylic copolymer and then extruding the suspension polymerized methacrylic copolymer.

The present invention now will be described more fully hereinafter in the following detailed description of the invention.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Methacrylic Copolymer

A methacrylic copolymer of the present invention can be prepared by polymerizing a monomer mixture comprising a $C_{6-20}$ aromatic methacrylate, a $C_{6-20}$ aliphatic methacrylate, or a combination thereof (a) and a mono-functional unsaturated monomer (b).

The aromatic or aliphatic methacrylate (a) may be used alone or in combination with one another. The aromatic or aliphatic methacrylate may be represented by the following Chemical Formula 1 or Chemical Formula 2.

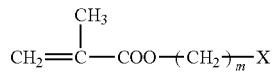

[Chemical Formula 1]

wherein m is an integer from 0 to 10, and X is a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, a benzylphenyl group or an aminophenyl group.

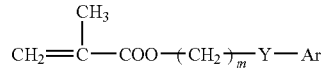

[Chemical Formula 2]

wherein m is an integer from 0 to 10, Y is oxygen (O) or sulfur (S), and Ar is a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group.

Examples of the aromatic or aliphatic methacrylate (a) may include without limitation cyclohexyl methacrylate, 2-ethylphenoxy methacrylate, 2-ethylthiophenyl methacrylate, 2-ethylaminophenyl methacrylate, phenyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methyl-phenylethyl methacrylate, 2-(4-propylphenyl)ethyl methacrylate, 2-(4-(1-methylethyl)phenyl)ethyl methacrylate, 2-(4-methoxyphenyl)ethylmethacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-benzylphenyl)ethyl methacrylate, and the like, and these may be used alone or in combination with one another.

Examples of the mono-functional unsaturated monomer (b) may include without limitation (meth)acrylic acid ester monomers, acrylic acid ester monomers, unsaturated carboxylic acid monomers, acid anhydride monomers, hydroxyl group containing ester monomers, (meth)acrylamide monomers, unsaturated nitrile monomers, allyl glycidyl ethers, glycidyl methacrylates, styrenic compounds, and the like, and combinations thereof. Exemplary (meth)acrylic acid ester monomers include without limitation methyl methacrylate, ethyl methacrylate, propyl methacrylate, butyl methacrylate and benzyl methacrylate. Exemplary acrylic acid ester monomers include without limitation methyl acrylate, ethyl acrylate, propyl acrylate, butyl acrylate, and 2-ethyl hexyl acrylate. Exemplary unsaturated carboxylic acid monomers include without limitation acrylic acid and methacrylic acid. Exemplary acid anhydride monomers include without limitation maleic anhydride. Exemplary hydroxyl group containing ester monomers include without limitation 2-hydroxyethyl acrylate, 2-hydroxypropyl acrylate, and monoglycerol acrylate. Exemplary (meth)acrylamide monomers include without limitation acryl amide and methacryl amide. Exemplary unsaturated nitrile monomers include without limitation acrylonitrile and methacrylonitrile. Exemplary styrenic monomers include without limitation styrene and α-methyl styrene. These monomers can be used alone or in combination with one another. In exemplary embodiments of the invention, the monomers can include methacrylic acid esters, acrylic acid esters, hydroxyl group containing esters or styrenic monomers, and in other exemplary embodiments of the invention the monomers can include methacrylic acid esters or acrylic acid esters.

The monomer mixture suitable for use in the methacrylic copolymer of the present invention may comprise about 20 to about 99.9% by weight of an aromatic methacrylate, an aliphatic methacrylate, or a combination thereof (a), and about 0.1 to about 80% by weight of a mono-functional unsaturated monomer (b). If the amount of the aromatic methacrylate, aliphatic methacrylate, or combination thereof is less than about 20% by weight, the average refractive index of polymerized methacylic copolymer may be lowered to less than 1.495. In an exemplary embodiment, the monomer mixture may comprise about 50 to about 95% by weight of an aromatic methacrylate, an aliphatic methacrylate, or a combination thereof (a) and about 5 to about 50% by weight of a mono-functional unsaturated monomer (b). In another exemplary embodiment, the monomer mixture may comprise about 55 to about 90% by weight of an aromatic methacrylate, an aliphatic methacrylate, or a combination thereof (a) and about 10 to about 45% by weight of a mono-functional unsaturated monomer (b). In another exemplary embodiment, the monomer mixture may comprise about 20 to about 45% by weight of an aromatic methacrylate, an aliphatic methacrylate, or a combination thereof (a) and about 55 to about 80% by weight of a mono-functional unsaturated monomer (b).

The methacrylic copolymer of the present invention may have a linear structure or a branched structure, or mixture thereof. Furthermore, the methacrylic copolymer can be a block copolymer, a random copolymer or a graft copolymer.

The methacrylic copolymer of the present invention may have a weight average molecular weight of about 3,000 to about 300,000 g/mol. Within this range of molecular weight, it is possible to obtain excellent transparency and colorability when blending with a polycarbonate resin. In exemplary embodiments, the methacrylic copolymer may have a weight average molecular weight of about 3,000 to about 10,000 g/mol. In other exemplary embodiments, the methacrylic copolymer may have a weight average molecular weight of about 12,000 to about 50,000 g/mol, while in other exemplary embodiments, the methacrylic copolymer may have a weight average molecular weight of about 50,000 to about 200,000 g/mol.

Furthermore, the methacrylic copolymer of the present invention may have a high refractive index of about 1.495 to about 1.59. In an exemplary embodiment, the methacrylic copolymer may have a refractive index of about 1.51 to about 1.59. In another exemplary embodiment, the methacrylic copolymer may have a refractive index of about 1.52 to about 1.59, while in another exemplary embodiment, the methacrylic copolymer may have a refractive index of about 1.53 to about 1.59.

Because the methacrylic copolymer of the present invention may have a high refractive index of about 1.495 to about 1.59, when it is blended with polycarbonate resin, it is possible to obtain a methacrylic resin composition having improved compatibility without any other compatibilizers.

Therefore, the methacrylic copolymer may be used as a substitute for PMMA resin in an alloy of polycarbonate-polymethylmethacrylate.

The methacrylic copolymer of the present invention may be blended with a polycarbonate resin and the blend may have a total light transmittance of about 10% or more and a haze of about 98% or less measured by a Haze meter at a sample thickness of about 2.5 mm. In exemplary embodiments, a sample with a thickness of about 2.5 mm prepared by extruding a blend comprising the methacrylic copolymer and a bisphenol-A linear polycarbonate resin having a weight average molecular weight of about 25,000 g/mol at a ratio of 2:8 may have a total light transmittance of about 10% or more and a haze of about 98% or less measured by a Haze meter. In exemplary embodiments, the haze of the blend may be about 1 to about 98%, about 1 to about 50%, about 1 to about 45% or about 1 to about 40%. In exemplary embodiments, the total light transmittance of the blend may be about 10 to about 90%, about 25 to about 90%, about 30 to about 90%, about 35 to about 90%, about 40 to about 90%, about 50 to about 90%, about 55 to about 90% or about 60 to about 90%.

Method for Preparing a Methacrylic Copolymer

Another aspect of the invention provides a method for preparing a methacrylic copolymer. The methacrylic copolymer of the present invention can be prepared by suspension polymerization, taking into account the desired refractive index. The present invention, however, is not limited to suspension polymerization, and other conventional polymerization methods may also be used.

In exemplary embodiments, the method may comprise suspension polymerizing a monomer mixture comprising a $C_{6-20}$ aromatic methacrylate, $C_{6-20}$ aliphatic methacrylate, or a combination thereof (a); and a mono-functional unsaturated monomer (b) in the presence of a polymerization initiator and a chain-transfer agent.

Conventional polymerization initiators can be used as a polymerization initiator. Examples of the polymerization initiators may include without limitation octanoyl peroxide, decanoyl peroxide, lauroyl peroxide, benzoyl peroxide, monochlorobenzoyl peroxide, dichloro benzoyl peroxide, p-methyl benzoyl peroxide, tert-butyl perbenzoate, azobisisobutyronitrile, azobis-(2,4-dimethyl)-valeronitrile and the like. These can be used alone or in combination with one another.

The chain-transfer agents may be used for controlling molecular weight and improving thermal stability. Although molecular weight can be controlled by the amount of polymerization initiators, the use of chain-transfer agents has advantages in that chain-transfer can make the ends of the chain have a secondary carbon structure by stopping the polymerization reaction, which results in high bond strength, a heat stable structure, and improved optical properties of methacrylic copolymers. In contrast, when the chain-transfer agents are not used, the ends of chains have double bonds by disproportionation which can reduce or minimize bond strength. Examples of chain-transfer agents suitable for use in the invention may comprise alkyl mercaptans represented by the formula $CH_3(CH_2)_nSH$, such as n-butyl mercaptan, n-octyl mercaptan, n-dodecyl mercaptan, tertiary dodecyl mercaptan, isopropyl mercaptan, n-amyl mercaptan and the like; halogen compounds such as carbon tetrachloride and the like; and aromatic compounds such as α-methyl styrene dimer and α-ethyl styrene dimer. The amount of the chain-transfer agent may vary depending on its type. The amount of the chain-transfer agent can range from about 0.02 to about 10 parts by weight, per 100 parts by weight of the monomer mixture. If the amount of the chain-transfer agent is less than about 0.02 parts by weight, thermal decomposition may occur, which may deteriorate heat resistance. If the amount of the chain transfer agent is more than about 10 parts by weight, the resin obtained therefrom may have a low molecular weight so that the mechanical properties may decrease.

In the method for making a methacrylic copolymer of the present invention, conventional suspension stabilizers and suspension stabilization aids may be used.

Examples of the suspension stabilizers may include organic suspension stabilizers such as polyalkylacrylate-acrylic acid, polyolefin-maleic acid, polyvinyl alcohol and cellulose, and inorganic suspension stabilizers such as tricalcium phosphate.

Examples of the suspension stabilization aids suitable for use in the present invention may include disodium hydrogen phosphate or sodium dihydrogen phosphate, and sodium sulfate may be employed to control solubility of an aqueous polymer or monomer.

Also, the methacrylic copolymer of the present invention may further comprise other additives such as but not limited to flame retardants, surfactants, nucleating agents, coupling agents, fillers, plasticizers, impact modifiers, antimicrobials, releasing agents, thermal stabilizers, antioxidants, light stabilizers, compatibilizers, inorganic fillers, coloring agents, stabilizers, lubricants, antistatic agents, pigments, dyes, flameproof agents, and the like, and combinations thereof. These additives may be added without limitation during polymerization or the pelletization process.

Examples of the antioxidants may include without limitation octadecyl 3-(3,5-di-tertiary butyl-4-hydroxyphenyl)propionate, triethylene glycol-bis-3(3-tertiary butyl-4-hydroxy-5-methylphenyl)propionate, 2,6-di-tertiary butyl-4-methyl phenol, 2,2'-methylenebis(4-methyl-6-tertiary-butylphenol), tris(2,4-di-tertiary-butylphenyl)phosphite, n-octadecyl-3(3,5-di-tertiarybutyl-4-hydroxyphenyl)propionate, 1,3,5-tri(3,5-di-tertiary-butyl-4-hydroxybenzyl)isocyanate, 3-(3,5-di-tertiary-butyl-4-hydroxyphenyl)propionate, distearyl thiodipropionate, lauryl thiopropionate methane, diphenylisooctyl phosphite, and the like, and combinations thereof.

In an exemplary embodiment of the present invention, additives such as but not limited to flame retardants, surfactants, nucleating agents, coupling agents, fillers, plasticizers, impact modifiers, antimicrobials, releasing agents, thermal stabilizers, antioxidants, light stabilizers, compatibilizers, inorganic fillers, coloring agents, stabilizers, lubricants, antistatic agents, pigments, dyes, flameproof agents, and the like may be added to the monomer mixture. These additives may be used alone or added in combination with one another.

In another exemplary embodiment, the method may further comprise adding at least one additive to the suspension-polymerized methacrylic copolymer; and extruding the mixture. Exemplary additives include without limitation flame retardants, surfactants, nucleating agents, coupling agents, fillers, plasticizers, impact modifiers, antimicrobials, releasing agents, thermal stabilizers, antioxidants, light stabilizers, compatibilizers, inorganic fillers, coloring agents, stabilizers, lubricants, antistatic agents, pigments, dyes, flameproof agents, and the like, and combinations thereof.

The methacrylic copolymer can be prepared by reaction conducted at about 65 to about 125° C., for example about 70 to about 120° C., for about 2 to about 8 hours.

After completing the polymerization reaction, the polymer may be cooled, washed, dehydrated and dried to obtain the polymer in particle form. The polymer may be then pelletized in an extrusion process to obtain a resin composition.

Compatibilizer

Another aspect of the present invention provides a compatibilizer comprising the methacrylic copolymer. In exemplary embodiments, the methacrylic copolymer may comprise (a) an aromatic methacrylate unit, an aliphatic methacrylate unit, or a combination thereof represented by the Chemical Formula 1 or Chemical Formula 2; and (b') a mono-functional unsaturated monomer unit selected from a $C_{1-6}$ alkyl(meth)acrylate or styrene. The methacrylic copolymer may have a weight molecular average weight of about 3,000 to about 300,000 g/mol of and a refractive index of about 1.495 to about 1.59.

In exemplary embodiments, the methacrylic copolymer may comprise (a) about 55 to about 90% by weight of an aromatic methacrylate unit, an aliphatic methacrylate unit, or a combination thereof; and (b') about 10 to about 45% by weight of a mono-functional unsaturated monomer unit.

In another exemplary embodiment, the methacrylic copolymer may further comprise a mono-functional unsaturated monomer unit (b") selected from the group consisting of unsaturated carboxylic acid monomers; acid anhydride monomers; hydroxyl group containing ester monomers; (meth)acrylamide monomers; unsaturated nitrile monomers; allyl glycidyl ethers; and glycidyl methacrylates. In exemplary embodiments, the methacrylic copolymer may comprise (a) about 60 to about 85% by weight of an aromatic methacrylate unit, an aliphatic methacrylate unit, or a combination thereof; (b') about 10 to about 30% by weight of a mono-functional unsaturated monomer unit; and (b") about 5 to about 20% by weight of a mono-functional unsaturated monomer unit (which is different from mono-functional unsaturated monomer unit b').

The compatibilizer is characterized in that a blend of the compatibilizer and a polycarbonate resin may have a total light transmittance of about 10% or more and a haze of about 98% or less as measured by a Haze meter. In exemplary embodiments, a sample with a thickness of about 2.5 mm prepared by extruding a blend comprising the methacrylic copolymer and a bisphenol-A linear polycarbonate resin having a weight average molecular weight of about 25,000 g/mol at a ratio of 2:8 may have a total light transmittance of about 10% or more and a haze of about 98% or less as measured by a Haze meter. In exemplary embodiments, the haze of the blend may be about 1 to about 98%, about 1 to about 50%, about 1 to about 45% or about 1 to about 40%. In exemplary embodiments, the total light transmittance of the blend may be about 10 to about 90%, about 25 to about 90%, about 30 to about 90%, about 35 to about 90%, about 40 to about 90%, about 50 to about 90%, about 55 to about 90% or about 60 to about 90%.

Another aspect of the present invention provides a method of using the compatibilizer as a compatibilizer in an alloy of a polycarbonate resin and a (meth)acrylate resin. In exemplary embodiments, the compatibilizer may be used in an amount of about 10 to about 40 parts by weight, for example about 15 to about 35 parts by weight, per 100 parts by weight of an alloy of a polycarbonate resin and a (meth)acrylate resin. The alloy may comprise without limitation about 40 to about 90% by weight of a polycarbonate resin and about 10 to about 60% by weight of a (meth)acrylate resin. In exemplary embodiments, the alloy may comprise about 55 to about 90% by weight of a polycarbonate resin and about 10 to about 45% by weight of a (meth)acrylate resin.

Methacrylic Resin Composition

Another aspect of the present invention provides a methacrylic resin composition using the methacrylic copolymer with a high refractive index. The composition comprises the methacrylic copolymer and a polycarbonate resin.

In an exemplary embodiment, the methacrylic resin composition may comprise about 1 to about 99 parts by weight of the methacrylic copolymer having a high refractive index; and about 1 to about 99 parts by weight of a polycarbonate resin. In another exemplary embodiment, the methacrylic resin composition may comprise about 5 to about 70 parts by weight of the methacrylic copolymer having a high refractive index; and about 30 to about 95 parts by weight of a polycarbonate resin. In other exemplary embodiments, the methacrylic resin composition may comprise about 10 to about 50 parts by weight of the methacrylic copolymer having a high refractive index; and about 50 to about 90 parts by weight of a polycarbonate resin. In other exemplary embodiments, the methacrylic resin composition may comprise about 10 to about 40 parts by weight of the methacrylic copolymer having a high refractive index; and about 60 to about 90 parts by weight of a polycarbonate resin.

The resin composition obtained from blending the methacrylic copolymer of the present invention and a polycarbonate resin can minimize the deterioration of transparency and colorability due to the difference between refractive index of the methacrylic copolymer and the polycarbonate resin. Therefore, the resin composition may have a good colorability and appearance in addition to excellent scratch resistance.

In exemplary embodiments, the resin, composition has a total light transmittance of about 10% or more and a haze of about 98% or less as measured by a Haze meter. In exemplary embodiments, the haze of the composition may be about 1 to about 98%, about 1 to about 50%, about 1 to about 45% or about 1 to about 40%. In exemplary embodiments, the total light transmittance of the blend may be about 10 to about 90%, about 25 to about 90%, about 30 to about 90%, about 35 to about 90%, about 40 to about 90%, about 50 to about 90%, about 55 to about 90% or about 60 to about 90%.

The resin composition may further comprise other additives such as but not limited to flame retardants, surfactants, nucleating agents, coupling agents, fillers, plasticizers, impact modifiers, antimicrobials, releasing agents, thermal stabilizers, antioxidants, light stabilizers, compatibilizers, inorganic fillers, coloring agents, stabilizers, lubricants, antistatic agents, pigments, dyes, flameproof agents, and the like. These additives may be used alone or in combination with one another.

The resin composition of the present invention can be prepared by mixing all the components and other additives together and then extruding through an extruder and can be prepared in the form of pellets. The pellets can be processed as appropriate to form a molded product, such as by injection or compression molding processes, although the invention is not limited to the same. The molded products can have good transparency, scratch resistance, appearance, colorability and mechanical strength, and thus the molded products can be used with products which need such properties. For example, the resin composition of the invention can be suitable for use in the inner/outer parts of electric/electronic goods or housings, automobile parts, construction materials, interior goods, toys, small household items/amenities and the like.

The invention may be better understood by reference to the following examples which are intended for the purpose of illustration and are not to be construed as in any way limiting the scope of the present invention, which is defined in the claims appended hereto.

EXAMPLES

Example 1

A monomer mixture comprising 70 parts by weight of phenyl methacrylate, 30 parts by weight of methyl methacrylate, 0.3 parts by weight of lauroyl peroxide and 0.31 parts by weight of normal-octyl mercaptan are mixed to form a homogeneous mixture.

Disodium hydrogen phosphate as a suspension stabilization aid and sodium sulfate are dissolved in 110 parts by weight of ion exchanged water in a stainless steel high-pressure reactor having stirring equipment, and 0.15 parts by weight of polyethylacrylate-methylacrylic acid as a suspension stabilizer is added thereto and stirred. The monomer mixture is added to the aqueous solution in which a suspension stabilizer is dissolved and stirred intensively while purging the reactor with an inert gas such as nitrogen or argon and heating the reactor. The reaction is conducted at 72° C. for 2 hours, then 110° C. for one hour to complete the polymerization reaction. The resultant product is washed, dehydrated and dried to obtain the polymer in particle form. Then, the molecular weight of the polymer is measured. The polymer particles are extruded and injected into a test specimen. The physical properties of the test specimen are measured. The results are shown in Table 1.

Example 2

Example 2 is conducted in the same manner as in Example 1 except a monomer mixture comprising 70 parts by weight of benzyl methacrylate and 30 parts by weight of methyl methacrylate is used.

Example 3

Example 3 is conducted in the same manner as in Example 1 except a monomer mixture comprising 70 parts by weight of phenoxyethyl methacrylate and 30 parts by weight of methyl methacrylate is used.

Example 4

Example 4 is conducted in the same manner as in Example 1 except a monomer mixture comprising 70 parts by weight of cyclohexyl methacrylate and 30 parts by weight of methyl methacrylate is used.

Example 5

Example 5 is conducted in the same manner as in Example 1 except a monomer mixture comprising 70 parts by weight of phenyl methacrylate and 30 parts by weight of ethyl methacrylate is used.

Example 6

Example 6 is conducted in the same manner as in Example 1 except a monomer mixture comprising 50 parts by weight of benzyl methacrylate, 20 parts by weight of cyclohexyl methacrylate and 30 parts by weight of n-propyl methacrylate is used.

Example 7

Example 7 is conducted in the same manner as in Example 1 except a monomer mixture comprising 30 parts by weight of phenyl methacrylate, 30 parts by weight of benzyl methacrylate, 10 parts by weight of cyclohexyl methacrylate and 30 parts by weight of styrene is used.

Comparative Example 1

Comparative Example 1 is conducted in the same manner as in Example 1 except 100 parts by weight of methyl methacrylate is added.

Comparative Example 2

Comparative Example 2 is conducted in the same manner as in Example 1 except a monomer mixture comprising 70 parts by weight of ethyl methacrylate and 30 parts by weight of methyl methacrylate is added.

Comparative Example 3

Comparative Example 3 is conducted in the same manner as in Example 1 except a monomer mixture comprising 70 parts by weight of n-propyl methacrylate and 30 parts by weight of methyl methacrylate is added.

The results of the physical properties and input amount of monomers in the Examples and Comparative Examples are shown in Table 1.

Method for Measuring the Physical Properties (1) Molecular weight: the molecular weight is measured by using a gel permeation chromatography (GPC).

(2) Refractive Index: the refractive index is measured using a refractometer manufactured by ATAGO Co., Ltd. of Japan (product name: DR-A1) at a sample thickness of 2.5 mm.

(3) Transparency: the transparency is evaluated as total light transmittance and haze, when blending with a polycarbonate resin. Particles prepared in the Examples and Comparative Examples are blended with a bisphenol-A linear polycarbonate resin having a weight average molecular weight of 25,000 g/mol (product name: PANLITE L-1250WP manufactured by TEIJIN Co., Ltd. of Japan) at a ratio of 2:8, and the resulting blend is extruded through a twin screw extruder (L/D=29, Φ=45 mm) to prepare product in pellet form. The pellets are dried at 80° C. for 6 hours and molded into test specimens through a 6 oz injector. Total light transmittance and haze are measured for the specimens with dimensions of L 90 mm×W 50 mm×T 2.5 mm by means of a Haze meter NDH 2000 manufactured by Nippon Denshoku Co., Ltd. of Japan. Total light transmittance is calculated by adding diffuse light transmittance (DF) and parallel transmittance (PT), and Haze (%) is calculated by diffuse light transmittance (DF)/total light transmittance (TT).

(4) Scratch resistance: scratch resistance is measured by a ball-type scratch profile (BSP) test. The BSP is conducted by applying a scratch of a length of 10 to 20 mm onto resin specimens with dimensions of L 90 mm×W 50 mm×T 2.5 mm at load of 1,000 g and a scratch speed of 75 mm/min, using a metal spherical tip with a diameter of 0.7 mm and measuring a profile of the applied scratch through a surface profile analyzer (XP-I) manufactured by Ambios Corporation which provides a scratch profile through surface scanning using a metal stylus tip with a diameter of 2 μm. The scratch resistance is evaluated from a scratch width by the measured profile. As the measured scratch width is decreased, the scratch resistance is increased.

TABLE 1

|  |  | Examples | | | | | | | Comparative Examples | | |
|---|---|---|---|---|---|---|---|---|---|---|---|
|  |  | 1 | 2 | 3 | 4 | 5 | 6 | 7 | 1 | 2 | 3 |
| Monomer | Phenyl methacrylate | 70 | — | — | — | 70 | — | 30 | — | — | — |
|  | Benzyl methacrylate | — | 70 | — | — | — | 50 | 30 | — | — | — |
|  | phenoxyethyl methacrylate | — | — | 70 | — | — | — | — | — | — | — |
|  | Cyclohexyl methacrylate | — | — | — | 70 | — | 20 | 10 | — | — | — |
|  | Methyl Methacrylate | 30 | 30 | 30 | 30 | — | — | — | 100 | 30 | 30 |
|  | Ethyl methacrylate | — | — | — | — | 30 | — | — | — | 70 | — |
|  | n-propyl methacrylate | — | — | — | — | — | 30 | — | — | — | 70 |
|  | Styrene | — | — | — | — | — | — | 30 | — | — | — |
| Properties of copolymer | Molecular weight Mw | 86K | 85K | 88K | 87K | 92K | 90K | 84K | 92K | 87K | 85K |
|  | Mn | 42K | 42K | 44K | 43K | 40K | 42K | 39K | 44K | 43K | 42K |
|  | Refractive index ($n_D$) | 1.537 | 1.536 | 1.532 | 1.502 | 1.537 | 1.534 | 1.540 | 1.488 | 1.486 | 1.485 |
| Blend with PC | Haze | 36.1 | 40.4 | 41.0 | 97.6 | 37.6 | 78.8 | 82.9 | 99.1 | 99.1 | 99.2 |
|  | Transmittance (TT) | 66.2 | 63.9 | 63.6 | 29.9 | 65.5 | 46.4 | 33.6 | 9.6 | 8.7 | 8.4 |
| BSP | Width (μm) | 289 | 290 | 291 | 288 | 295.4 | 297 | 288 | 289 | 296 | 298 |

As shown in Table 1, the methacrylic copolymer in Examples 1 to 7 exhibit excellent refractive index as compared with Comparative Examples using other monomers. In addition, the blend of polycarbonate and methacrylic copolymer in Examples 1 to 7 exhibit good Haze and transparency. However, in the case of blending polycarbonate with the (co)polymer in Comparative Examples 1 to 3, haze and transparency are deteriorated.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A methacrylic copolymer prepared by polymerizing a monomer mixture comprising:
   (a) about 20 to about 99.9% by weight of an aromatic methacrylate represented by the following Chemical Formula 1, an aliphatic methacrylate represented by the following Chemical Formula 2, or a combination thereof

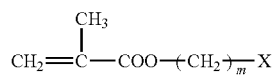

[Chemical Formula 1]

wherein m is an integer from 0 to 10, and X is a phenyl group, a methylphenyl group, a methylethylphenyl group, a methoxyphenyl group, a cyclohexylphenyl group, a chlorophenyl group, a bromophenyl group, a phenylphenyl group, a benzylphenyl group or an aminophenyl group;

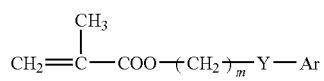

[Chemical Formula 2]

wherein m is an integer from 0 to 10, Y is oxygen (O) or sulfur (S), and Ar is a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group; and
   (b) about 0.1 to about 80% by weight of a mono-functional unsaturated monomer selected from the group consisting of (meth)acrylic acid esters, acrylic acid esters, unsaturated carboxylic acids, acid anhydrides, hydroxyl group containing esters, (meth)acrylamides, unsaturated nitriles, allyl glycidyl ethers, glycidyl methacrylates, styrenic monomers, and combinations thereof;
   wherein a sample with a thickness of about 2.5 mm prepared by extruding a blend of said methacrylic copolymer and a bisphenol-A linear polycarbonate resin having a weight average molecular weight of about 25,000 g/mol at a ratio of 2:8 has a total light transmittance of about 10% or more and a haze of about 98% or less measured by a Haze meter.

2. The methacrylic copolymer of claim 1, wherein said methacrylic copolymer comprises (a) about 50 to about 90% by weight of the aromatic methacrylate, aliphatic methacrylate, or combination thereof; and (b) about 10 to about 50% by weight of the mono-functional unsaturated monomer.

3. The methacrylic copolymer of claim 1, wherein said (meth)acrylic acid ester is selected from the group consisting of methyl methacrylate, ethyl methacrylate, propyl methacrylate, butyl methacrylate and benzyl methacrylate; said acrylic acid ester is selected from the group consisting of methyl acrylate, ethyl acrylate, propyl acrylate, butyl acrylate, and 2-ethyl hexyl acrylate; said unsaturated carboxylic acid is selected from the group consisting of acrylic acid and methacrylic acid; said acid anhydride is maleic anhydride; said hydroxyl group containing ester is selected from the group consisting of 2-hydroxyethyl acrylate, 2-hydroxypropyl acrylate, and monoglycerol acrylate; said (meth)acrylamide is selected from the group consisting of acryl amide and methacryl amide; said unsaturated nitrile is selected from the group consisting of acrylonitrile and methacrylonitrile; and said styrenic monomer is selected from the group consisting of styrene and α-methyl styrene.

4. The methacrylic copolymer of claim 1, wherein said methacrylic copolymer has a weight average molecular weight of about 3,000 to about 300,000 g/mol and a refractive index of about 1.495 to about 1.59.

5. The methacrylic copolymer of claim 1, wherein said total light transmittance is about 30% or more.

6. A compatibilizer comprising a methacrylic copolymer comprising:
   (a) an aromatic methacrylate unit represented by the following Chemical Formula 1, an aliphatic methacrylate unit represented by the following Chemical Formula 2, or a combination thereof;

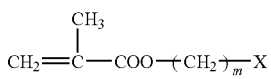

[Chemical Formula 1]

wherein m is an integer from 0 to 10, and X is a phenyl group, a methylphenyl group, a methylethylphenyl group, a methoxyphenyl group, a cyclohexylphenyl group, a chlorophenyl group, a bromophenyl group, a phenylphenyl group, a benzylphenyl group or an aminophenyl group

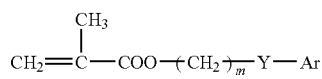

[Chemical Formula 2]

wherein m is an integer from 0 to 10, Y is oxygen (O) or sulfur (S), and Ar is a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group; and
   (b') a mono-functional unsaturated monomer unit selected from a $C_{1-6}$ alkyl(meth)acrylate or styrene,
   wherein the methacrylic copolymer has a weight molecular average weight of about 3,000 to about 300,000 g/mol, and a refractive index of about 1.495 to about 1.59.

7. The compatibilizer of claim 6, wherein said copolymer comprises about 55 to about 90% by weight of the aromatic methacrylate unit, the aliphatic methacrylate unit, or a combination thereof, and (b') about 10 to about 45% by weight of the mono-functional unsaturated monomer unit.

8. The compatibilizer of claim 6, wherein said copolymer further comprises a mono-functional unsaturated monomer unit selected from the group consisting of unsaturated carboxylic acids, acid anhydrides, hydroxyl group containing esters, (meth)acrylamides, unsaturated nitriles, allyl glycidyl ethers, and glycidyl methacrylates.

9. The compatibilizer of claim 6, wherein a sample with a thickness of about 2.5 mm prepared by extruding a blend of said methacrylic copolymer and a bisphenol-A linear polycarbonate resin having a weight average molecular weight of about 25,000 g/mol at a ratio of 2:8 has a total light transmittance of about 10% or more and a haze of about 98% or less measured by a Haze meter.

10. The compatibilizer of claim 9, wherein said total light transmittance is about 30% or more.

11. A methacrylic resin composition comprising about 1 to about 99 parts by weight of the methacrylic copolymer of claim 1; and about 1 to about 99 parts by weight of a polycarbonate resin.

12. The methacrylic resin composition of claim 11, wherein said resin composition further comprises at least one additive selected from the group consisting of flame retardants, surfactants, nucleating agents, coupling agents, fillers, plasticizers, impact modifiers, antimicrobials, releasing agents, thermal stabilizers, antioxidants, light stabilizers, compatibilizers, inorganic fillers, coloring agents, stabilizers, lubricants, antistatic agents, pigments, dyes, flameproof agents, and combinations thereof.

13. The methacrylic resin composition of claim 11, wherein said resin composition has a total light transmittance of about 10% or more and a haze of about 98% or less measured by a Haze meter.

14. A method of compatibilizing an alloy of a polycarbonate resin and a (meth)acrylate resin, comprising adding the compatibilizer of claim 6 as a compatibilizer to an alloy of a polycarbonate resin and a (meth)acrylate resin.

15. The method of claim 14, wherein said compatibilizer is used in an amount of about 10 to about 40 parts by weight, per 100 parts by weight of the alloy of the polycarbonate resin and the (meth)acrylate resin.

16. A method for preparing a methacrylic copolymer, the method comprising:

suspension-polymerizing a monomer mixture comprising (a) an aromatic methacrylate represented by the following Chemical Formula 1, an aliphatic methacrylate represented by the following Chemical Formula 2, or a combination thereof

[Chemical Formula 1]

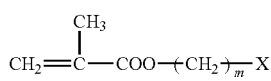

wherein m is an integer from 0 to 10, and X is a phenyl group, a methylphenyl group, a methylethylphenyl group, a methoxyphenyl group, a cyclohexylphenyl group, a chlorophenyl group, a bromophenyl group, a phenylphenyl group, a benzylphenyl group or an aminophenyl group,

[Chemical Formula 2]

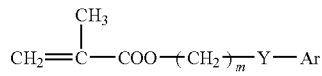

wherein m is an integer from 0 to 10, Y is oxygen (O) or sulfur (S), and Ar is a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group; and (b) a mono-functional unsaturated monomer selected from the group consisting of (meth)acrylic acid esters, acrylic acid ester monomers, unsaturated carboxylic acids, acid anhydrides, hydroxyl group containing esters, (meth)acrylamides, unsaturated nitriles, allyl glycidyl ethers, glycidyl methacrylates, styrenic monomers, and combinations thereof, in presence of a polymerization initiator and a chain-transfer agent.

17. The method of claim 16, further comprising adding to said monomer mixture at least one additive selected from the group consisting of flame retardants, surfactants, nucleating agents, coupling agents, fillers, plasticizers, impact modifiers, antimicrobials, releasing agents, thermal stabilizers, antioxidants, light stabilizers, compatibilizers, inorganic fillers, coloring agents, stabilizers, lubricants, antistatic agents, pigments, dyes, flameproof agents, and combinations thereof, before the suspension polymerization.

18. The method of claim 16, further comprising adding to the suspension polymerized methacrylic copolymer at least one additive selected from the group consisting of flame retardants, surfactants, nucleating agents, coupling agents, fillers, plasticizers, impact modifiers, antimicrobials, releasing agents, thermal stabilizers, antioxidants, light stabilizers, compatibilizers, inorganic fillers, coloring agents, stabilizers, lubricants, antistatic agents, pigments, dyes, flameproof agents, and combinations thereof; and extruding the suspension polymerized methacrylic copolymer.

* * * * *